(12) United States Patent
Balani et al.

(10) Patent No.: US 9,183,062 B2
(45) Date of Patent: Nov. 10, 2015

(54) AUTOMATED APPLICATION RECONFIGURATION

(71) Applicant: International Business Machines Corporation, Armonk, NY (US)

(72) Inventors: Rahul Balani, New Delhi (IN); Deepak Jeswani, New Delhi (IN); Akshat Verma, New Delhi (IN); Kamal Bhattacharya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 13/775,519

(22) Filed: Feb. 25, 2013

(65) Prior Publication Data

US 2014/0245292 A1    Aug. 28, 2014

(51) Int. Cl.
*G06F 9/455* (2006.01)
*G06F 9/50* (2006.01)

(52) U.S. Cl.
CPC .......... *G06F 9/5077* (2013.01); *G06F 9/45558* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 6,735,691 B1 | 5/2004 | Capps et al. | |
| 7,028,079 B2 | 4/2006 | Mastrianni et al. | |
| 7,278,133 B2* | 10/2007 | Roman et al. | 717/120 |
| 7,818,410 B1 | 10/2010 | Barnes et al. | |
| 8,108,456 B2 | 1/2012 | Chen et al. | |
| 8,181,174 B2 | 5/2012 | Liu | |
| 8,255,484 B2 | 8/2012 | Khandekar et al. | |
| 8,352,936 B2 | 1/2013 | Chowdhury et al. | |
| 8,869,139 B2* | 10/2014 | Le et al. | 717/174 |
| 2003/0167245 A1* | 9/2003 | Murata | 706/46 |
| 2003/0172373 A1 | 9/2003 | Henrickson et al. | |
| 2004/0044990 A1* | 3/2004 | Schloegel et al. | 717/113 |
| 2004/0197013 A1* | 10/2004 | Kamei | 382/118 |
| 2007/0078988 A1* | 4/2007 | Miloushev et al. | 709/227 |
| 2007/0162521 A1 | 7/2007 | Raghunath | |
| 2009/0064136 A1 | 3/2009 | Dow et al. | |
| 2009/0070366 A1* | 3/2009 | Zhao et al. | 707/102 |
| 2009/0319521 A1* | 12/2009 | Groeneveld et al. | 707/6 |

(Continued)

OTHER PUBLICATIONS

Configuration File, Nov. 16, 2012, Wikipedia, pp. 1-4.*

(Continued)

*Primary Examiner* — Emerson Puente
*Assistant Examiner* — Zhi Chen
(74) *Attorney, Agent, or Firm* — Ryan, Mason & Lewis, LLP

(57) ABSTRACT

Techniques, systems, and articles of manufacture for automated application reconfiguration. A method includes identifying, for each of one or more configuration files in a pre-configured source virtual machine, a corresponding configuration file in a target virtual machine, identifying one or more mis-configured and/or missing points of variability in the one or more identified configuration files in the target virtual machine based on information derived from the one or more configuration files in the source virtual machine, and reconfiguring the target virtual machine by replacing each identified mis-configured point of variability with a given value based on the information derived from the one or more configuration files in the source virtual machine, and adding each identified missing point of variability at a given location with a given value and a given format based on the information derived from the one or more configuration files in the source virtual machine.

12 Claims, 6 Drawing Sheets

(56) References Cited

U.S. PATENT DOCUMENTS

| | | | |
|---|---|---|---|
| 2009/0327688 A1* | 12/2009 | Li et al. | 713/100 |
| 2010/0095297 A1 | 4/2010 | Sethi et al. | |
| 2010/0104158 A1* | 4/2010 | Shechtman et al. | 382/131 |
| 2010/0114842 A1* | 5/2010 | Forman et al. | 707/692 |
| 2010/0198837 A1* | 8/2010 | Wu et al. | 707/748 |
| 2010/0223306 A1* | 9/2010 | Liu et al. | 707/822 |
| 2011/0022694 A1 | 1/2011 | Dalal et al. | |
| 2011/0107327 A1* | 5/2011 | Barkie et al. | 717/176 |
| 2012/0136989 A1 | 5/2012 | Ferris et al. | |
| 2012/0151198 A1 | 6/2012 | Gupta et al. | |
| 2012/0151476 A1* | 6/2012 | Vincent | 718/1 |
| 2012/0233611 A1 | 9/2012 | Voccio | |
| 2013/0227714 A1* | 8/2013 | Gula et al. | 726/32 |
| 2014/0007092 A1* | 1/2014 | Barbee et al. | 718/1 |

OTHER PUBLICATIONS

Microsoft Press, Microsoft Computer Dictionary, Mar. 22, 2002, Microsoft Press, p. 123.*
IAmAI, Middleware, Feb. 22, 2013, Wikipedia, p. 1-4.*
Microsoft Press, Microsoft Computer Dictionary, Mar. 22, 2002, Microsoft Press, p. 340.*
Jbzdak, Mahalanobis distance, Jan. 6, 2012, Wikipedia, pp. 1-4.*
Svick, Tree (data structure), Jan. 27, 2012, Wikipedia, pp. 1-4.*
FrescoBot, Abstract syntax tree, Feb. 12, 2012, Wikipedia, pp. 1-3.*
Paulino et al. Smart: An Application Reconfiguration Framework. Complex Systems Design & Management, 2010, pp. 73-84.
Chen et al. A Two-Level Virtual Machine Self-Reconfiguration Mechanism for the Cloud Computing Platforms. Ubiquitous Intelligence & Computing and 9th International Conference on Autonomic & Trusted Computing (UIC/ATC), 2012 9th International Conference on Date of Conference: Sep. 4-7, 2012.
Migliardi et al. Dynamic Reconfiguration and Virtual Machine Management in the Harness Metacomputing System. Computing in Object-Oriented Parallel Environments, Lecture Notes in Computer Science vol. 1505, 1998, pp. 127-134.
IPCOM000216660D. Method and System for Pushing Image-Based Software Customization in a Virtual Machine. Apr. 12, 2012.
Binz et al. CMotion: A Framework for Migration of Applications into and between Clouds. Institute of Architecture of Application Systems. 2011.
Sethi et al. A Framework for Migrating Production Snapshots of Composite Applications to Virtualized Environments. 12th IFIP/IEEE IM 2011: Mini Conference.
Eilam et al. Managing the Configuration Complexity of Distributed Applications in Internet Data Centers. 2006 IEEE Communications Magazine.
Amazon Elastic Computer Cloud (EC2). http://aws.amazon.com/ec2 downloaded Jan. 30, 2013.
Crimson Consulting Group White Paper: Cost of Ownership Analysis. May 12, 2011.
Oracle: Cost of Ownership Analysis. Aug. 2011.
Albrecht et al. Remote control: distributed application configuration, management, and visualization with plush. In Proc. of LISA, 2007.
Ayachitula et al. IT service management automation—a hybrid methodology to integrate and orchestrate collaborative human centric and automation centric workflows. IEEE International Conference on Services Computing, SCC 2007.
Balani et al. PoV miner: Highly Accurate Configuration Mining for Error-free Reconfiguration. Jan. 31, 2013.
Balter et al. Architecturing and configuring distributed application with Olan. In Proc. of Middleware, 1998.
Ganguly et al. Reducing Complexity of Software Deployment with Delta Configuration. In Proc. of Integrated Network Management, 2007.
Ma et al. Model-Based Dependency Management for Migrating Service Hosting Environment. In Proc. IEEE SCC, 2007.
Magoutis et al. Galapagos: Automatically discovering application-data relationships in networked systems. In Proc. of IEEE IM, 2007.
Mell et al. The NIST Definition of Cloud Computing. In NIST Special Publication 800-145, 2011.
Sapuntzakis et al. Virtual appliances for deploying and maintaining software. In Proc. Usenix LISA, 2003.
Vij et al. Cloud to cloud interoperability and federation—intercloud. In IEEE P2302Ⅰ D0.2 Draft Standard for Intercloud Interoperability and Federation (SIIF), 2012.
VMWare, Inc. Managing Multi-Tiered Applications with VMware vApp. vSphere Virtual Machine Administration Guide, 2011.

* cited by examiner

AUTOMATED APPLICATION RECONFIGURATION

FIELD OF THE INVENTION

Embodiments of the invention generally relate to information technology, and, more particularly, to application configuration technology.

BACKGROUND

Application configuration is a time-consuming and expensive process with many manual steps. Additionally, an application configuration process is required in many applications such as automated application deployment and management (troubleshooting), application reinstallation during migration to a cloud environment, etc. It is possible to automate some steps in the process that work at the operating system level, but application-dependent steps require manual efforts (driven by ad hoc scripts). Consequently, application configuration is typically performed by experts, contributing to additional cost associated with the process.

Cloud computing presents a model to automatically deploy workloads using standard templates. However, in existing approaches, reconfiguring an application to work in a new environment remains manual and time-consuming.

Accordingly, a need exists to automatically identify configuration files in a new target virtual machine (VM) independent of the application and reconfigure the files with desired values for points of variability (PoVs).

SUMMARY

In one aspect of the present invention, techniques for automated application reconfiguration are provided. An exemplary computer-implemented method can include steps of identifying, for each of one or more configuration files in a pre-configured source virtual machine, a corresponding configuration file in a target virtual machine, identifying one or more mis-configured and/or missing points of variability in the one or more identified configuration files in the target virtual machine based on information derived from the one or more configuration files in the source virtual machine, and reconfiguring the target virtual machine by replacing each identified mis-configured point of variability with a given value based on the information derived from the one or more configuration files in the source virtual machine, and adding each identified missing point of variability at a given location with a given value and a given format based on the information derived from the one or more configuration files in the source virtual machine.

In another aspect of the invention, an exemplary computer-implemented method to can include steps of searching a file system of a target virtual machine to identify, for each of one or more configuration files in a source virtual machine, a corresponding configuration file in the target virtual machine based on similarity in file location, file name, and/or keyword distribution in file content, and identifying one or more mis-configured and/or missing points of variability in the one or more identified configuration files in the target virtual machine based on information derived from the one or more configuration files in the source virtual machine. The method also includes reconfiguring the target virtual machine by replacing each identified mis-configured point of variability with a given value based on the information derived from the one or more configuration files in the source virtual machine, and adding each identified missing point of variability at a given location with a given value and a given format based on the information derived from the one or more configuration files in the source virtual machine, and deploying the reconfigured target virtual machine into a target environment.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
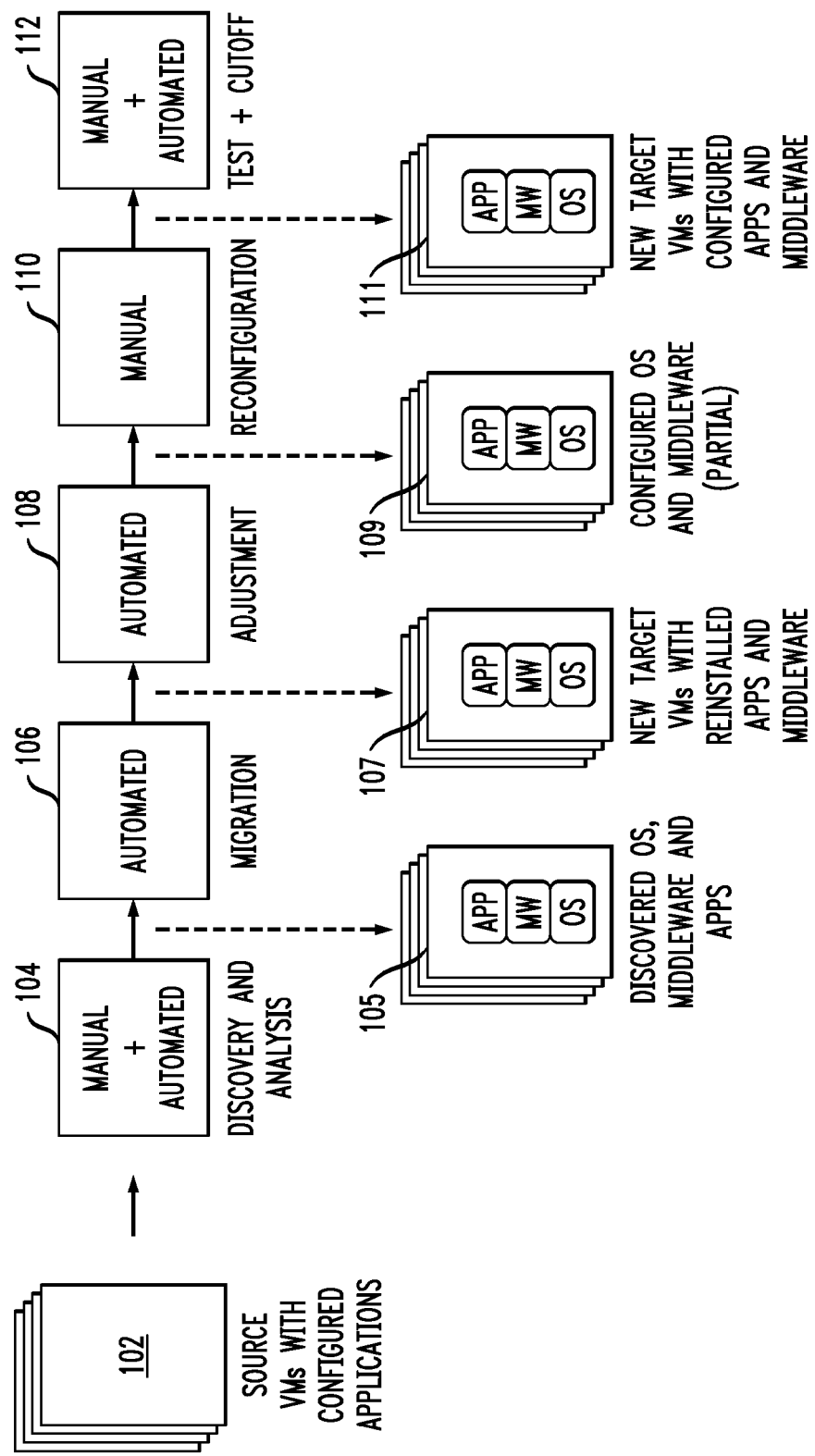
FIG. 1 is a diagram illustrating a migration flow with an application reinstallation, according to an embodiment of the invention.

As described herein, an aspect of the present invention includes automated application reconfiguration using file similarity analysis and adjustments. Application (re)configuration involves setting and/or modifying environment parameters referred to herein as points of variability (PoVs) in constituent virtual machines (VMs). At least one embodiment of the invention is based on the concept that the PoVs occur in configuration files as key-value pairs. Accordingly, an aspect of the invention includes using file name, path and key matches to discover equivalent configuration files in target VMs. Additionally, aspects of the invention further include representing configuration files using a generic abstract syntax tree (AST), and matching ASTs using structural and contextual information to determine the occurrence of PoVs in target VMs.

As used herein, an "application" denotes a set of virtual machines which host multiple components and communicate with each other to provide an end-to-end application functionality.

Accordingly, as detailed herein, at least one embodiment of the invention includes providing application-independent techniques to automatically configure applications in target VMs based on application configuration in source VMs. Such techniques include reaching target VM images, and classifying files in each target image based on each file's similarity to configuration files in one or more source images. Additionally, such techniques also include automatically identifying mis-configured or missing PoVs in selected files, and adjusting the selected files by fixing mis-configured PoVs and adding missing PoVs.

At least one embodiment of the invention includes automatically configuring new instances of a workload by leveraging a pre-configured instance. Additionally, application instances including those that may be installed differently or may be running a different version of the application, middleware or operating system can also be configured using techniques described herein.

As detailed herein, at least one embodiment of the invention includes mapping configuration files from the template instance to configuration files in each new instance. Further, configuration nodes in a source file are mapped to a target file, and configuration information is automatically added in the target instance. The mapping is performed, as described herein, using text and structure analysis in the configuration files.

By way of illustration, consider automatically configuring application instances $A_T$ from one example configured instance $A_S$. Each application includes a set of images. Each configuration parameter that varies across environment is captured as a PoV parameter. Typical examples of PoV include interne protocol (IP) addresses, media access control (MAC) addresses, ports, host-names, user-names, passwords, authentication tokens, etc. Configuring an application to work in an environment requires setting PoVs in configuration files to a correct value as dictated by the environment. As used herein, $I_S^i$ denotes an image i of the example application instance $A_S$ and $I_T^i$ denotes an image of a target application instance $A_T$ that is desired to be configured.

In at least one embodiment of the invention, input includes the set of configuration files in each source image of the application instance $A_S$. For each configuration file $F_S^{i,j}$, a set of <PoV, Location> tuples is provided which indicates the location of each PoV in the file. An objective of at least one embodiment of the invention is to annotate PoVs for each configuration file $F_T^{i,j}$ in the target application that corresponds to some configuration file $F_S^{i,j}$ in $A_S$. Once the PoVs are annotated, they are replaced by the actual values of the PoVs in the target environment. If the PoVs are not found in the target environment, at least one embodiment of the invention includes annotating locations in configuration files, where the PoVs are to be added along with the exact format to represent the PoV.

Accordingly, for each source configuration file $F_S^{i,j}$, at least one embodiment of the invention includes determining an equivalent target file $F_T^{i,j}$. Additionally, for each <PoV, Location> tuple in $F_S^{i,j}$, at least one embodiment of the invention includes determining (a) the tuple in $F_T^{i,j}$ or (b) the location in $F_T^{i,j}$ to insert the PoV.

FIG. 1 is a diagram illustrating a migration flow with an application reinstallation, according to an embodiment of the invention. By way of illustration, FIG. 1 depicts source VMs 102 with configured applications. Additionally, step 104 includes manual and automated techniques for discovery and analysis, which results in a discovered operating system (OS), middleware and applications 105. Step 106 includes automated techniques for migration, which results in new target VMs with reinstalled applications and middleware 107. Also, step 108 includes automated techniques for adjustment, which results in a (partially) configured OS and middleware 109. Further, step 110 includes manual techniques for reconfiguration, which results in new target VMs with configured applications and middleware 111. Additionally, as also depicted in FIG. 1, step 112 includes manual and automated techniques for testing the newly configured applications and deploying them in the production environment (that is, cut-off from the source environment).

Figure 2:
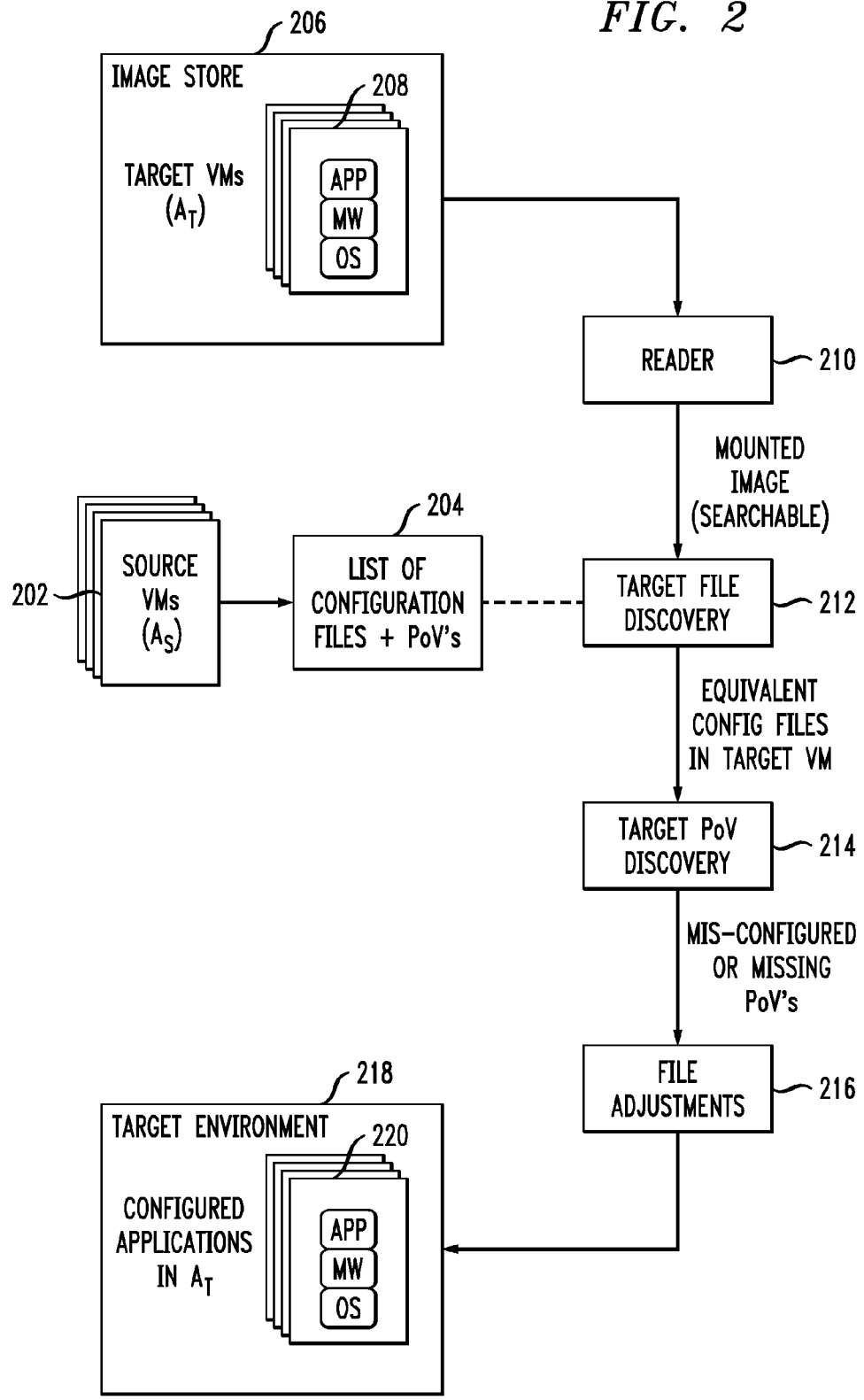
FIG. 2 is a block diagram illustrating an example embodiment, according to an aspect of the invention.

FIG. 2 is a block diagram illustrating an example embodiment, according to an aspect of the invention. By way of illustration, FIG. 2 depicts source VMs ($A_S$) 202, a list of configuration files and PoVs 204, an image store 206 that includes target VMs ($A_T$) 208, and a target environment 218 that will host the configured applications in $A_T$ 220. Additionally, FIG. 2 depicts a reader module 210, a target file discovery module 212, a target PoV discovery module 214 and a file adjustments module 216.

The reader module 210 mounts the target virtual machine $I_T^i$ (with pre-configured OS and partially configured middleware) and facilitates crawling the file system, identifying any configuration related information, and making relevant changes. In at least one embodiment of the invention, a file similarity analysis includes selecting all files in the target image (VM) that match the given configuration files in source images.

Accordingly, the target file discovery (TFD) module 212 takes source configuration files (for example, from component 204) as input, scans the target image 208 and identifies, for each source file $F_S^{i,j}$, its equivalent configuration file $F_T^{i,j}$ in the image $I_T^i$. The target PoV discovery (TPoD) module 214 searches through the identified configuration files $F_T^{i,j}$ to locate mis-configured and/or missing PoVs using structural and contextual information derived from annotations of the source configuration files. The PoVs are annotated in the target file, if found, or the location is identified to insert PoVs.

The file adjustments module 216 takes, as input, <PoV, Location> tuples for each PoV found in the target files and <Location, format> tuples for missing PoVs. Mis-configured PoVs are replaced with correct values, while the missing PoVs are added at the correct locations using the desired values and format extracted from the source configuration files. At least one embodiment of the invention also includes capturing, in each image's metadata, the PoV and associated details that can be used to recreate a working application in any new environment. Further, at least one embodiment of the invention further includes taking a set of virtual machine images, corresponding PoV metadata, and a target environment 218 specification, and deploying the target application by updating all PoVs.

As also described herein, an aspect of the invention includes identifying target files while considering changes in location, name and content. Such techniques include identifying target files based on similarity in file location, file name, and/or keyword distribution in file content. Further, for file location, at least one embodiment of the invention includes considering changes due to installation options as more likely to occur in lower level directories, and accordingly giving a higher weight to matches in lower level directories by using a suffix match.

Additionally, a lack of linkages and permutation of content imply that the source tuples cannot be directly mapped to a target file. To address this problem, an aspect of the invention includes implementing a hierarchical element mapping scheme wherein a tree is created for the entire configuration file (both source and target) and relevant nodes in the source file are mapped to respective nodes in the target file.

At least one embodiment of the invention can additionally include implementing fuzzy content markers. A mapping scheme of an example embodiment of the invention can include the use of attributes of each node and mapping each node to a target node even if the content does not match exactly. The use of fuzzy content markers enables such an embodiment of the invention to deal with noise created by changes in versions.

Further, an aspect of the invention includes leveraging the logical structure of a configuration file. Accordingly, at least one embodiment of the invention includes using the structure of a tree (as described herein) to map nodes that cannot be mapped by content alone. As note herein, content (or value) of PoVs may differ between source and target files. However, a keyword in the same section as the PoV may match across the two files using a content marker.

Figure 3:
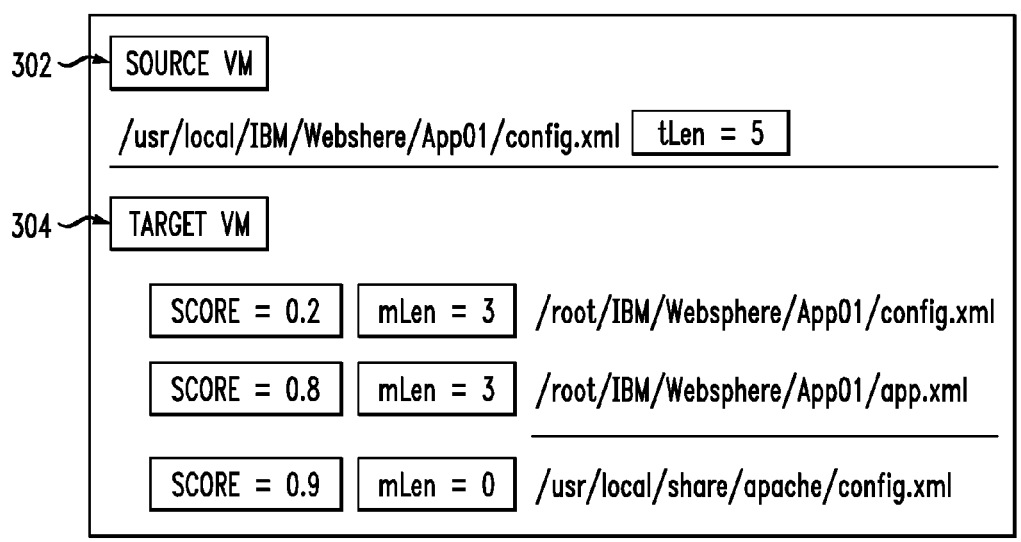
FIG. 3 is a diagram illustrating target file discovery, according to an embodiment of the invention.

FIG. 3 is a diagram illustrating target file discovery, according to an embodiment of the invention. By way of illustration, FIG. 3 depicts an example of a location-name filter with a source VM 302 and a target VM 304. As depicted in FIG. 3, the last file in the target VM 304 is not considered because of the presence of first two files, but is shown here for illustration only.

The TFD module (such as component 212 in FIG. 2) crawls a mounted image $I_T^i$ to discover text files that may be potential target candidates for the set of input source files $\{F_S^{i,j}\}$. For each source file in the input set, the TFD module filters the set of candidate files through sequential application of two filters, a location-name filter and a key-distribution filter. The location-name filter attempts to identify equivalent target files by exploiting similarity in file names and paths in a prioritized fashion. When a full path and file name match fails, the underlying algorithm searches for files with identical names and the longest common suffix in the file path, as shown in FIG. 3. For each non-zero suffix match with a target file, at least one embodiment of the invention includes recording mLen, which is the length of the common suffix. In addition, to account for a change or a swap in file names, at least one embodiment of the invention also includes recording mLen for the target text files with a non-zero suffix but non-identical names.

If all of the above-noted checks fail to determine a set of candidate target files for a source file, the TFD module stores and records all of the files with identical names but zero common suffixes in their file paths. The latter case is typically encountered in the case of a missing file or a version upgrade for an application that incorporates its version number in naming its last-level directory for storing configuration files.

With respect to the key-distribution filter, when multiple candidate files are discovered in the above process, the TFD module uses the distribution of key names in source and target files to determine the closest target file. Standard diff-based approaches for checking file similarity may fail here due to the difference in the value of configuration parameters between source and candidate target files. In addition, it is often not possible to rely on relative order of key-value pairs for generating a content-based diff due to permutation or absence of key-value tuples. Therefore, key names can be the only reliable option that is mostly constant across different versions of software.

Additionally, the TFD module uses key names extracted from the source file annotations and records the distribution of the key names in a vector for each candidate file. The normalized distance between the frequency vectors for a given source file and a candidate file f is combined with the respective file-path-match score to assign a total score S to each candidate file as:

$$S = \alpha\left(1 - \frac{mLen}{tLen}\right) + (1-\alpha)D_f,$$

where tLen is the total length of a source file path, $\alpha$ is some pre-defined weight, and $D_f$ is the normalized distance between frequency vectors. The candidate file with the lowest combined score is selected as the match for the given source file.

The TPoD module (such as component 214 in FIG. 2) searches for mis-configured and/or missing PoVs in each target file $F_T^{i,j}$ using the annotated tree of the respective source file $F_S^{i,j}$. These annotations identify the nodes representing PoVs in the source tree and other contextual information such as nodes containing keys along with the types of their respective values contained in sibling nodes.

In at least one embodiment of the invention, the TPoD module derives an equivalent tree representation of the target file to define parent, child and sibling relationships between the constituent nodes. Besides facilitating structural comparison of the two trees, these relationships help to identify the context in which the PoV values are to occur in the target file. This is necessary as the source and target files often contain the exact (or nearly identical) key names corresponding to a PoV, but with different respective values. Note also that while the standard diff-based approach to patch target files can handle permutations and missing parameters, it cannot deal with modifications of key names. Further, all of the parameters from the source file need not be copied over to the target file to preserve application functionality, as many parameters are installation- or image-specific, such as the install path.

Given the source and target tree representations, the TPoD module attempts to trace the path to each PoV node in the target tree by utilizing the corresponding path obtained from the source tree. Starting from the tree root, each node in the source path is mapped to its respective node in the target path. If the complete path exists in the target tree, the PoV is reconfigured to its correct value. Otherwise, the last node in the target path, which matches with the corresponding node in the source path, is identified for adding the missing sub-tree containing the PoV.

The mapping from source to target nodes is non-trivial due to the fact that nodes are neither associated with unique identifiers nor can their absolute order of appearance in the configuration files be used to assign one. Moreover, unlike solutions for graph isomorphism, the tree structure alone may not be sufficient to derive accurate node mappings because the sub-trees rooted at sibling nodes often have identical structure (which results in ambiguity), and in the case of missing PoV components from the target file, the tree structure of the file is different (which results in incorrect decisions).

Consequently, in at least one embodiment of the invention, structural information is combined with contextual information from the configuration trees to obtain correct node mappings. The TPoD module employs a standard extensible markup language (XML) parser to load an XML configuration file into its equivalent tree representation. For non-XML files, the TPoD module can use a generic file parser to eliminate dependence over multiple third party modules (for robustness) at the risk of loss of script-specific knowledge.

The TPoD module handles XML files separately from non-XML files due to the difference in tree structures and node properties/attributes. In at least one embodiment of the invention, the TPoD module assigns a fuzzy similarity score to each source and target node pair at a given level in the trees using corresponding tag names, attribute names and values. A mapping is established between a source and target node pair when the pair's score satisfies a certain configurable threshold. However, due to the typical structure of XML configuration files where identical tags and attribute names are used to define multiple components within a single file, deviations from the expected one-to-one mappings may be observed. In at least one embodiment of the invention, subsequent ambiguity resolution uses limited structural information from the tree (for example, the number of children) and attempts to recursively map the children of ambiguous node pairs using the same process.

Additionally, the TPoD module decomposes a non-XML target file into an abstract syntax tree (AST) that includes components, variables, delimiters and VarList nodes. Each component includes a key-value tuple representing a PoV with the possibility of several related key-value pairs grouped into a complex value rooted at a VarList node. Consequently, the resulting ASTs can be short but wide, with many component nodes.

Additionally, at each level in the source and target trees, components are matched using a similarity ratio of the primary keys of the components that typically appear in corresponding sub-trees as the leftmost child. While the primary keys are unique for a majority of the components, some deviations are observed in configuration files with multiple sections demarcated by a unique descriptor. In such cases, relative distance and the ordering of components with identical primary keys is used to resolve the ambiguity. By way of example, a component with a simple PoV value found in the target is replaced completely by the respective component from the source node. However, a PoV value embedded inside a VarList node is searched and replaced similarly in a recursive fashion.

Figure 4:
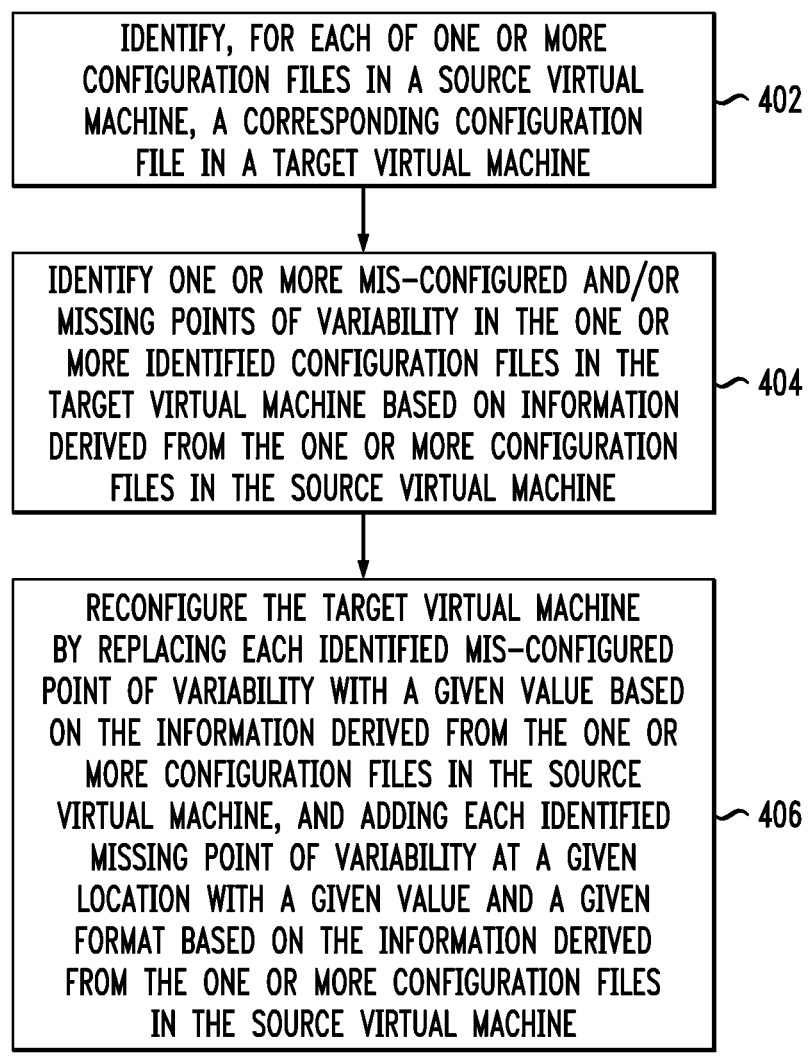
FIG. 4 is a flow diagram illustrating techniques according to an embodiment of the invention.

FIG. 4 is a flow diagram illustrating techniques according to an embodiment of the present invention. Step 402 includes identifying, for each of one or more configuration files in a (pre-configured) source virtual machine, a corresponding configuration file in a target virtual machine. The techniques depicted in FIG. 4 can also include capturing one or more configuration files and corresponding points of variability in a source virtual machine as input. Additionally the identification of step 402 can include identifying based on similarity in file location, file name, and/or keyword distribution in file content.

Further, at least one embodiment of the invention can include implementing a hierarchical element mapping scheme wherein a tree is created for each configuration file in the source virtual machine and the target virtual machine, and mapping relevant nodes from a tree representing a configuration file in the source virtual machine to respective nodes in a tree representing a configuration file in the target virtual machine. Also, at least one embodiment of the invention can further include implementing one or more fuzzy content markers to facilitate mapping a relevant node from a tree representing a configuration file in the source virtual machine to a respective node in a tree representing a configuration file in the target virtual machine even if content of the two nodes does not match exactly.

Step 404 includes identifying one or more mis-configured and/or missing points of variability in the one or more identified configuration files in the target virtual machine based on information derived from the one or more configuration files in the source virtual machine. As described herein, a point of variability can include an internet protocol address, a media access control address, a port, a host-name, a user-name, a password, an authentication token and/or a configuration parameter used by an application, middleware and/or software.

Additionally, the identification step of step 404 can include identifying based on structural and contextual information derived from the one or more configuration files in the source virtual machine. Further, as described herein, an identified mis-configured point of variability is annotated in the associated configuration file in the target virtual machine, and a location where a missing point of variability should exist is identified in the associated configuration file in the target virtual machine.

Step 406 includes reconfiguring the target virtual machine by replacing each identified mis-configured point of variability with a given value based on the information derived from the one or more configuration files in the source virtual machine, and adding each identified missing point of variability at a given location with a given value and a given format based on the information derived from the one or more configuration files in the source virtual machine.

Figure 5:
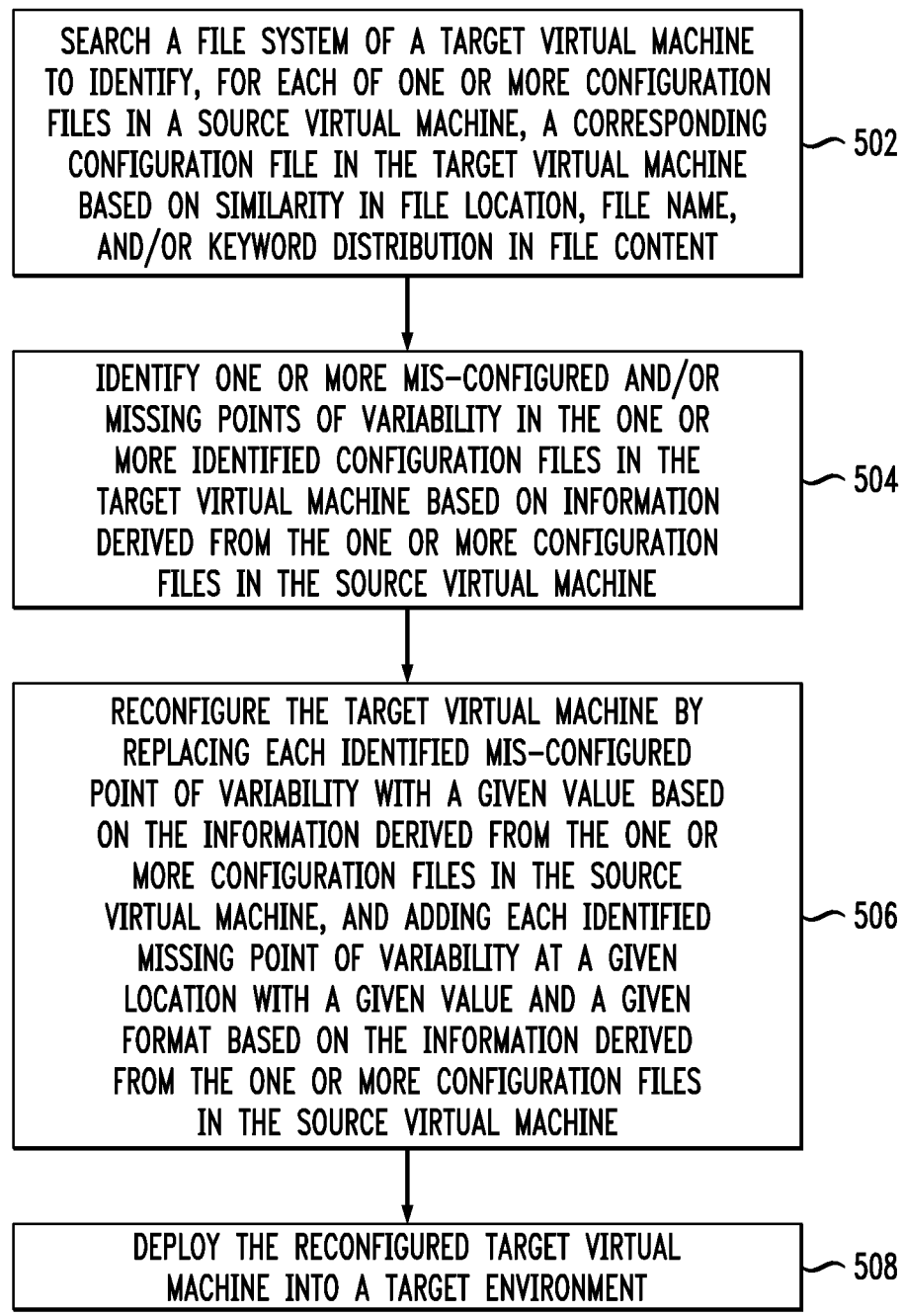
FIG. 5 is a flow diagram illustrating techniques according to an embodiment of the invention.

FIG. 5 is a flow diagram illustrating techniques according to an embodiment of the invention. Step 502 includes searching a file system of a target virtual machine to identify, for each of one or more configuration files in a source virtual machine, a corresponding configuration file in the target virtual machine based on similarity in file location, file name, and/or keyword distribution in file content. Step 504 includes identifying one or more mis-configured and/or missing points of variability in the one or more identified configuration files in the target virtual machine based on information derived from the one or more configuration files in the source virtual machine. As noted herein, a point of variability can include an internet protocol address, a media access control address, a port, a host-name, a user-name, a password, an authentication token and/or a configuration parameter used by an application, middleware and/or software.

Step 506 includes reconfiguring the target virtual machine by replacing each identified mis-configured point of variability with a given value based on the information derived from the one or more configuration files in the source virtual machine, and adding each identified missing point of variability at a given location with a given value and a given format based on the information derived from the one or more configuration files in the source virtual machine. Step 508 includes deploying the reconfigured target virtual machine into a target environment.

The techniques depicted in FIG. 4 and FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 and FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 6:
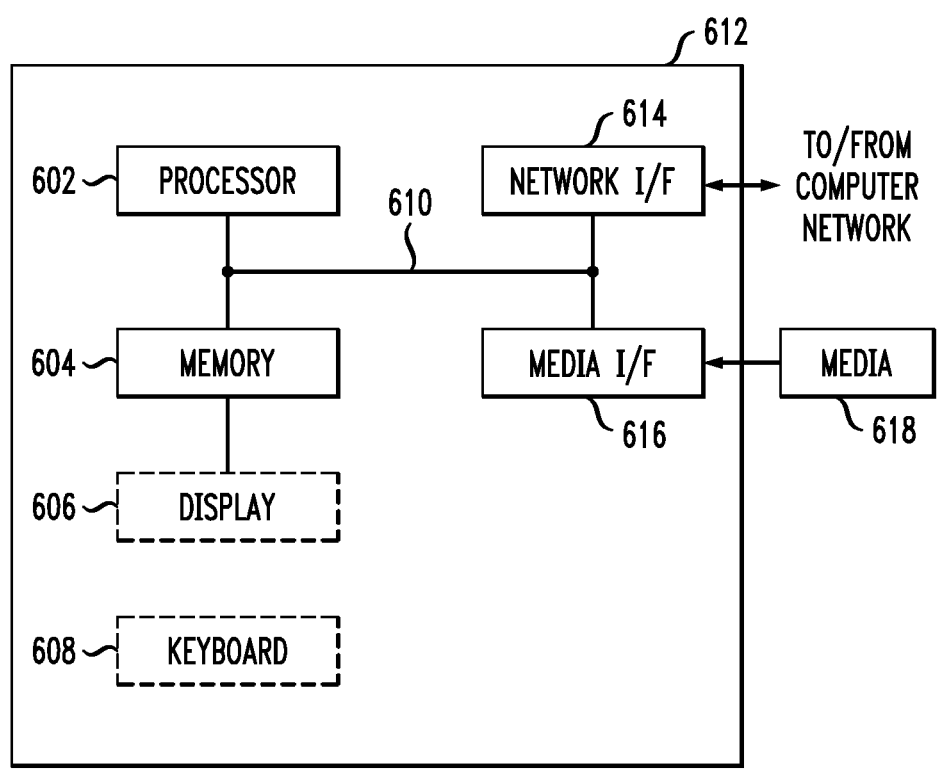
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, using structural and contextual information to determine an occurrence of a PoV in a target VM.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   identifying, for each of one or more configuration files in a pre-configured source virtual machine, a corresponding configuration file in a target virtual machine via:
   filtering a set of multiple candidate configurations files in the target virtual machine based on application of (i) a location-name filter and (ii) a keyword distribution filter, wherein:
   said location-name filter compares a file name and a path associated with each of the multiple candidate configuration files to the one or more configuration files in the pre-configured source virtual machine; and
   said keyword distribution filter analyzes a similarity in keyword distribution in file content for each of the multiple candidate configuration files in comparison to the one or more configuration files in the pre-configured source virtual machine; and
   wherein said filtering comprises:
   recording the keyword distribution in a vector for each of the respective candidate configuration files;
   combining (i) a normalized distance between the vector for each of the respective candidate configuration files and a vector for each of the respective corresponding configuration files in the pre-configured source virtual machine and (ii) a match score corresponding to the path associated with each of the respective candidate configuration files and each of the respective corresponding configuration files in the pre-configured source virtual machine to generate an overall matching score; and selecting the respective candidate configuration file with the lowest overall matching score;

identifying one or more mis-configured and/or missing points of variability in the selected configuration file in the target virtual machine based on information derived from the one or more configuration files in the source virtual machine, wherein each of the one or more mis-configured and/or missing points of variability in the selected configuration file in the target virtual machine are derived from at least one of an application-specific configuration file and a middleware-specific configuration file, and wherein said identifying the one or more mis-configured and/or missing points of variability comprises:

implementing a hierarchical element mapping scheme wherein (i) a source tree is created for each configuration file in the source virtual machine and a target tree is created for each configuration file in the target virtual machine; and mapping one or more nodes from the source tree to respective nodes in the target tree based on (i) content and (ii) at least one additional node attribute; and reconfiguring the target virtual machine by replacing each identified mis-configured point of variability with a given value based on the information derived from the one or more configuration files in the source virtual machine, and adding each identified missing point of variability at a given location with a given value and a given format based on the information derived from the one or more configuration files in the source virtual machine;

wherein at least one of the steps is carried out by a computer device.

2. The method of claim 1, wherein a point of variability comprises an internet protocol address, a media access control address, a port, a host-name, a user-name, a password, an authentication token and/or a configuration parameter used by an application, middleware and/or software.

3. The method of claim 1, comprising:
capturing one or more configuration files and corresponding points of variability in a source virtual machine as input.

4. The method of claim 1, wherein said identifying one or more mis-configured and/or missing points of variability comprises identifying based on structural and contextual information derived from the one or more configuration files in the source virtual machine.

5. The method of claim 1, comprising:
implementing one or more fuzzy content markers to facilitate mapping a relevant node from a tree representing a configuration file in the source virtual machine to a respective node in a tree representing a configuration file in the target virtual machine even if content of the two nodes does not match exactly.

6. The method of claim 1, wherein an identified mis-configured point of variability is annotated in the associated configuration file in the target virtual machine.

7. The method of claim 1, wherein a location where a missing point of variability should exist is identified in the associated configuration file in the target virtual machine.

8. An article of manufacture comprising a non-transitory computer readable storage medium having computer readable instructions tangibly embodied thereon which, when implemented, cause a computer to carry out a plurality of method steps comprising:

identifying, for each of one or more configuration files in a pre-configured source virtual machine, a corresponding configuration file in a target virtual machine via:

filtering a set of multiple candidate configurations files in the target virtual machine based on application of (i) a location-name filter and (ii) a keyword distribution filter, wherein:

said location-name filter compares a file name and a path associated with each of the multiple candidate configuration files to the one or more configuration files in the pre-configured source virtual machine; and said keyword distribution filter analyzes a similarity in keyword distribution in file content for each of the multiple candidate configuration files in comparison to the one or more configuration files in the pre-configured source virtual machine; and wherein said filtering comprises:

recording the keyword distribution in a vector for each of the respective candidate configuration files;

combining (i) a normalized distance between the vector for each of the respective candidate configuration files and a vector for each of the respective corresponding configuration files in the pre-configured source virtual machine and (ii) a match score corresponding to the path associated with each of the respective candidate configuration files and each of the respective corresponding configuration files in the pre-configured source virtual machine to generate an overall matching score; and selecting the respective candidate configuration file with the lowest overall matching score;

identifying one or more mis-configured and/or missing points of variability in the selected configuration file in the target virtual machine based on information derived from the one or more configuration files in the source virtual machine, wherein each of the one or more mis-configured and/or missing points of variability in the selected configuration file in the target virtual machine are derived from at least one of an application-specific configuration file and a middleware-specific configuration file, and wherein said identifying the one or more mis-configured and/or missing points of variability comprises:

implementing a hierarchical element mapping scheme wherein (i) a source tree is created for each configuration file in the source virtual machine and a target tree is created for each configuration file in the target virtual machine; and mapping one or more nodes from the source tree to respective nodes in the target tree based on (i) content and (ii) at least one additional node attribute; and reconfiguring the target virtual machine by replacing each identified mis-configured point of variability with a given value based on the information derived from the one or more configuration files in the source virtual machine, and adding each identified missing point of variability at a given location with a given value and a given format based on the information derived from the one or more configuration files in the source virtual machine.

9. The article of manufacture of claim 8, wherein a point of variability comprises an internet protocol address, a media access control address, a port, a host-name, a user-name, a password, an authentication token and/or a configuration parameter used by an application, middleware and/or software.

10. A system comprising:
a memory; and
at least one processor coupled to the memory and operative for:
identifying, for each of one or more configuration files in a pre-configured source virtual machine, a corresponding configuration file in a target virtual machine via:
filtering a set of multiple candidate configurations files in the target virtual machine based on application of (i) a location-name filter and (ii) a keyword distribution filter, wherein:
said location-name filter compares a file name and a path associated with each of the multiple candidate configuration files to the one or more configuration files in the pre-configured source virtual machine; and
said keyword distribution filter analyzes a similarity in keyword distribution in file content for each of the multiple candidate configuration files in comparison to the one or more configuration files in the pre-configured source virtual machine; and
wherein said filtering comprises:
recording the keyword distribution in a vector for each of the respective candidate configuration files;
combining (i) a normalized distance between the vector for each of the respective candidate configuration files and a vector for each of the respective corresponding configuration files in the pre-configured source virtual machine and (ii) a match score corresponding to the path associated with each of the respective candidate configuration files and each of the respective corresponding configuration files in the pre-configured source virtual machine to generate an overall matching score; and
selecting the respective candidate configuration file with the lowest overall matching score;
identifying one or more mis-configured and/or missing points of variability in the selected configuration file in the target virtual machine based on information derived from the one or more configuration files in the source virtual machine, wherein each of the one or more mis-configured and/or missing points of variability in the selected configuration file in the target virtual machine are derived from at least one of an application-specific configuration file and a middleware-specific configuration file, and wherein said identifying the one or more mis-configured and/or missing points of variability comprises:
implementing a hierarchical element mapping scheme wherein (i) a source tree is created for each configuration file in the source virtual machine and a target tree is created for each configuration file in the target virtual machine; and
mapping one or more nodes from the source tree to respective nodes in the target tree based on (i) content and (ii) at least one additional node attribute; and
reconfiguring the target virtual machine by replacing each identified mis-configured point of variability with a given value based on the information derived from the one or more configuration files in the source virtual machine, and adding each identified missing point of variability at a given location with a given value and a given format based on the information derived from the one or more configuration files in the source virtual machine.

11. A method comprising:
searching a file system of a target virtual machine to identify, for each of one or more configuration files in a source virtual machine, a corresponding configuration file in the target virtual machine based on similarity in file location, file name, and/or keyword distribution in file content via:
filtering a set of multiple candidate configurations files in the target virtual machine based on application of (i) a location-name filter and (ii) a keyword distribution filter, wherein:
said location-name filter compares a file name and a path associated with each of the multiple candidate configuration files to the one or more configuration files in the pre-configured source virtual machine; and
said keyword distribution filter analyzes a similarity in keyword distribution in file content for each of the multiple candidate configuration files in comparison to the one or more configuration files in the pre-configured source virtual machine; and
wherein said filtering comprises:
recording the keyword distribution in a vector for each of the respective candidate configuration files;
combining (i) a normalized distance between the vector for each of the respective candidate configuration files and a vector for each of the respective corresponding configuration files in the pre-configured source virtual machine and (ii) a match score corresponding to the path associated with each of the respective candidate configuration files and each of the respective corresponding configuration files in the pre-configured source virtual machine to generate an overall matching score; and
selecting the respective candidate configuration file with the lowest overall matching score;
identifying one or more mis-configured and/or missing points of variability in the selected configuration file in the target virtual machine based on information derived from the one or more configuration files in the source virtual machine, wherein each of the one or more mis-configured and/or missing points of variability in the selected configuration file in the target virtual machine are derived from at least one of an application-specific configuration file and a middleware-specific configuration file, and wherein said identifying the one or more mis-configured and/or missing points of variability comprises:
implementing a hierarchical element mapping scheme wherein (i) a source tree is created for each configuration file in the source virtual machine and a target tree is created for each configuration file in the target virtual machine; and
mapping one or more nodes from the source tree to respective nodes in the target tree based on (i) content and (ii) at least one additional node attribute;
reconfiguring the target virtual machine by replacing each identified mis-configured point of variability with a given value based on the information derived from the one or more configuration files in the source virtual machine, and adding each identified missing point of variability at a given location with a given value and a given format based on the information derived from the one or more configuration files in the source virtual machine; and deploying the reconfigured target virtual machine into a target environment;

wherein at least one of the steps is carried out by a computer device.

12. The method of claim 11, wherein a point of variability comprises an internet protocol address, a media access control address, a port, a host-name, a user-name, a password, an authentication token and/or a configuration parameter used by an application, middleware and/or software.

* * * * *